(12) United States Patent
Tiwari et al.

(10) Patent No.: US 10,949,409 B2
(45) Date of Patent: Mar. 16, 2021

(54) ON-DEMAND, DYNAMIC AND OPTIMIZED INDEXING IN NATURAL LANGUAGE PROCESSING

(71) Applicant: SAP SE, Walldorf (DE)

(72) Inventors: Rahul Tiwari, Allahabad/ U.P. (IN); Harikrishnan Mangayil, Allahabad/ U.P. (IN); Nikita Jain, Allahabad/ U.P. (IN); Rakesh Kelappan, Allahabad/ U.P. (IN)

(73) Assignee: SAP SE, Walldorf (DE)

( * ) Notice: Subject to any disclaimer, the term of this patent is extended or adjusted under 35 U.S.C. 154(b) by 374 days.

(21) Appl. No.: 15/926,856

(22) Filed: Mar. 20, 2018

(65) Prior Publication Data

US 2019/0179928 A1 Jun. 13, 2019

(30) Foreign Application Priority Data

Dec. 13, 2017 (IN) .............................. 201741044724

(51) Int. Cl.
| | |
|---|---|
| G06F 16/178 | (2019.01) |
| G06F 16/22 | (2019.01) |
| G06F 16/93 | (2019.01) |
| G06F 16/2458 | (2019.01) |
| G06F 16/9535 | (2019.01) |
| G06F 16/901 | (2019.01) |
| G06F 16/31 | (2019.01) |

(52) U.S. Cl.
CPC ...... *G06F 16/2272* (2019.01); *G06F 16/2255* (2019.01); *G06F 16/2477* (2019.01); *G06F 16/316* (2019.01); *G06F 16/901* (2019.01); *G06F 16/93* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 2013/0124194 A1* | 5/2013 | Nadal | ..................... G06F 40/40 704/9 |
| 2014/0229457 A1* | 8/2014 | Sydell | ................... G06F 16/178 707/698 |
| 2017/0116260 A1* | 4/2017 | Chattopadhyay | ..... G06F 16/243 |

* cited by examiner

*Primary Examiner* — Thu N Nguyen
(74) *Attorney, Agent, or Firm* — Fish & Richardson P.C.

(57) ABSTRACT

Indexing natural language processing, a request is received from a user to access a document at a server, the server routes the request to an indexing server. A validation service checks if the CUID of the document is available in the indexing server repository or a file system associated with the indexing server. If the CUID of dataset exists, determine if a timestamp of the new document matches the timestamp of the previously indexed document. Upon determining that the above conditions are fulfilled, the previously indexed data is returned to the server. If it is determined that the above conditions do not match, then a transformation service is invoked at the indexing server. The transformation service compares a hash value of a dataset. If the transformation service determines that the hash value of a dataset in the document is not available, an indexing service is invoked to index the document.

17 Claims, 12 Drawing Sheets

| DATA MANIPULATION ACTIONS | IS RE-INDEXING REQUIRED? | IS LIST OF VALUES (LOV) INDEXING OR METADATA INDEXING REQUIRED? |
|---|---|---|
| SORT | NO | NO |
| DUPLICATE | YES | LOV+METADATA |
| RENAME | YES | METADATA |
| REMOVE | YES | METADATA |
| CREATE MEASURE | YES | METADATA |
| CREATE CALCULATION | YES | LOV+METADATA |
| SPLIT | YES | LOV+METADATA |
| FILL | YES | LOV+METADATA |
| TRIM | YES | LOV |
| REPLACE | YES | LOV |
| CONVERT CASE | NO | NO |
| CONVERT TO | YES | LOV+METADATA |
| GROUP BY | YES | LOV+METADATA |

ON-DEMAND, DYNAMIC AND OPTIMIZED INDEXING IN NATURAL LANGUAGE PROCESSING

This application claims the benefit of and priority to India Provisional Patent Application No. 201741044724, filed 13 Dec. 2017, titled "ON-DEMAND, DYNAMIC AND OPTIMIZED INDEXING IN NATURAL LANGUAGE PROCESSING".

BACKGROUND

A data analytics application may have the capability to take natural language inputs in the form of free text inputs and generate a query to be executed on some server/servers to retrieve results. The results may be presented in a form of data visualizations such as maps, charts, and infographics. Some data analytics applications enable data manipulation along with data visualization. A document is a file that contains connection parameters to data source, dataset including tables, graphical representations of data using the dataset, etc. The document may be stored in multiple servers or cluster servers. When the document is accessed, the document is indexed so that future accessing of the document is quick and efficient. When the document is available on multiple servers, it is challenging to determine if indexing is to be performed on all the servers, or on selected servers. Further, a user, while accessing the document, may temporarily discontinue to access the document and switch to a different document, in that scenario the indexing shall be dynamically optimized to avoid unnecessary indexing. Further, when the user switches back to the document, indexing should be dynamically optimized again to avoid redundant or repetitive indexing.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques of on-demand, dynamic and optimized indexing in natural language processing are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
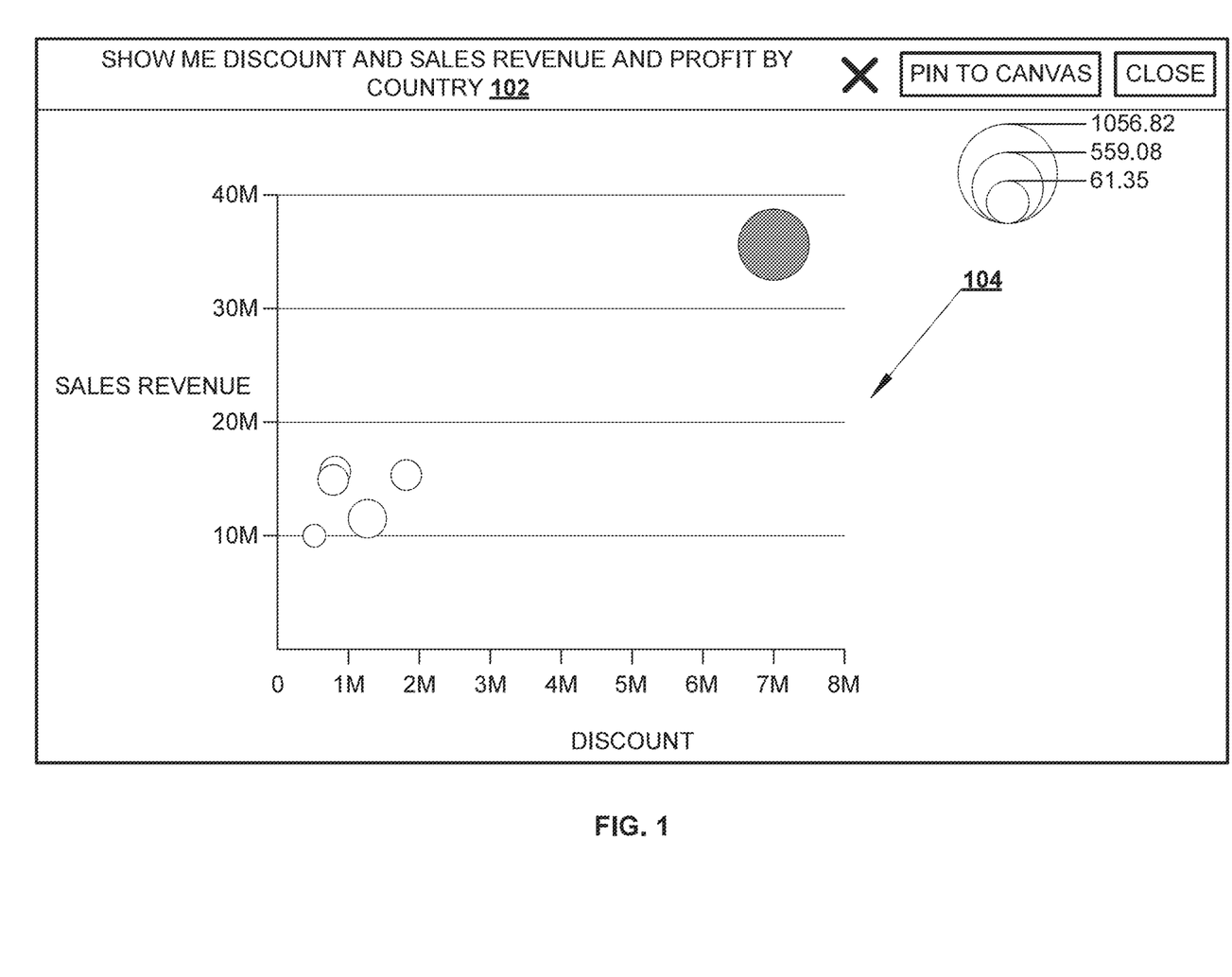
FIG. 1 is a block diagram of a user interface illustrating a document in an analytics application, according to one embodiment.

FIG. 1 is a block diagram of a user interface illustrating a document in a data analytics application, according to one embodiment. A natural language input 'show me discount and sales revenue and profit by country' 102 is provided in the data analytics application. Based on the received natural language input, bubble chart 104 is provided as a visual representation in the document in the user interface. The natural language input is transformed to a query and the query is sent to some server/servers for execution. The transformation of the natural language input to the query is performed by functionalities in the data analytics application. For example, the transformation may be performed as text analysis using natural language processing engine. Text analysis is the process of analyzing unstructured text, extracting relevant information and then transforming that information into structured information for the purpose of business analysis, research and investigation. The result of execution of the query is provided in the form of the bubble chart 104 in a document. The corresponding document may be indexed and saved in a file system or repository. A workflow may be defined as an action or sequence of actions performed in the document. For example, creating a document may be a workflow, adding and deleting a column may be another workflow, providing a natural language input to query may be another workflow, etc. A document is a file that contains connection parameters to data source, dataset including tables, graphical representations of data using the dataset, etc. When the document is saved, the document may be stored in a repository for members or users in the team to access the document. The document is loaded into memory for a user to view and edit the document. The document may be created, accessed, changed, synchronized, deleted and executed in the data analytics application and stored on a server. A user may work on the document in the data analytics application. The document may include data and visualization of the data acquired from a dataset.

When the document is indexed, the indexing would remain the same as long as there are no changes to the document. The document may include data from various datasets. An individual dataset may be associated with a data source. The dataset may be in the form of tables with column names and cell values in row store format. Indexing or updating the indexing, also referred to as re-indexing, is required when: a document is newly created; a document is opened from a different server; data manipulation operations are performed on dataset such as change of column name, replacement of cell values, deletion of column, merging of multiple columns into one column, duplicating a column to create a new column, etc. Further, indexing or re-indexing is required when a new dataset is added to an existing document and when multiple users work on the same document that is located in a cluster server. In the cluster server setup, multiple servers may store the same document, or the document may be stored on a single server among the cluster of servers. When a request is received from the user to access the document, the request is directed to an appropriate server or servers within the cluster of servers.

Figure 2:
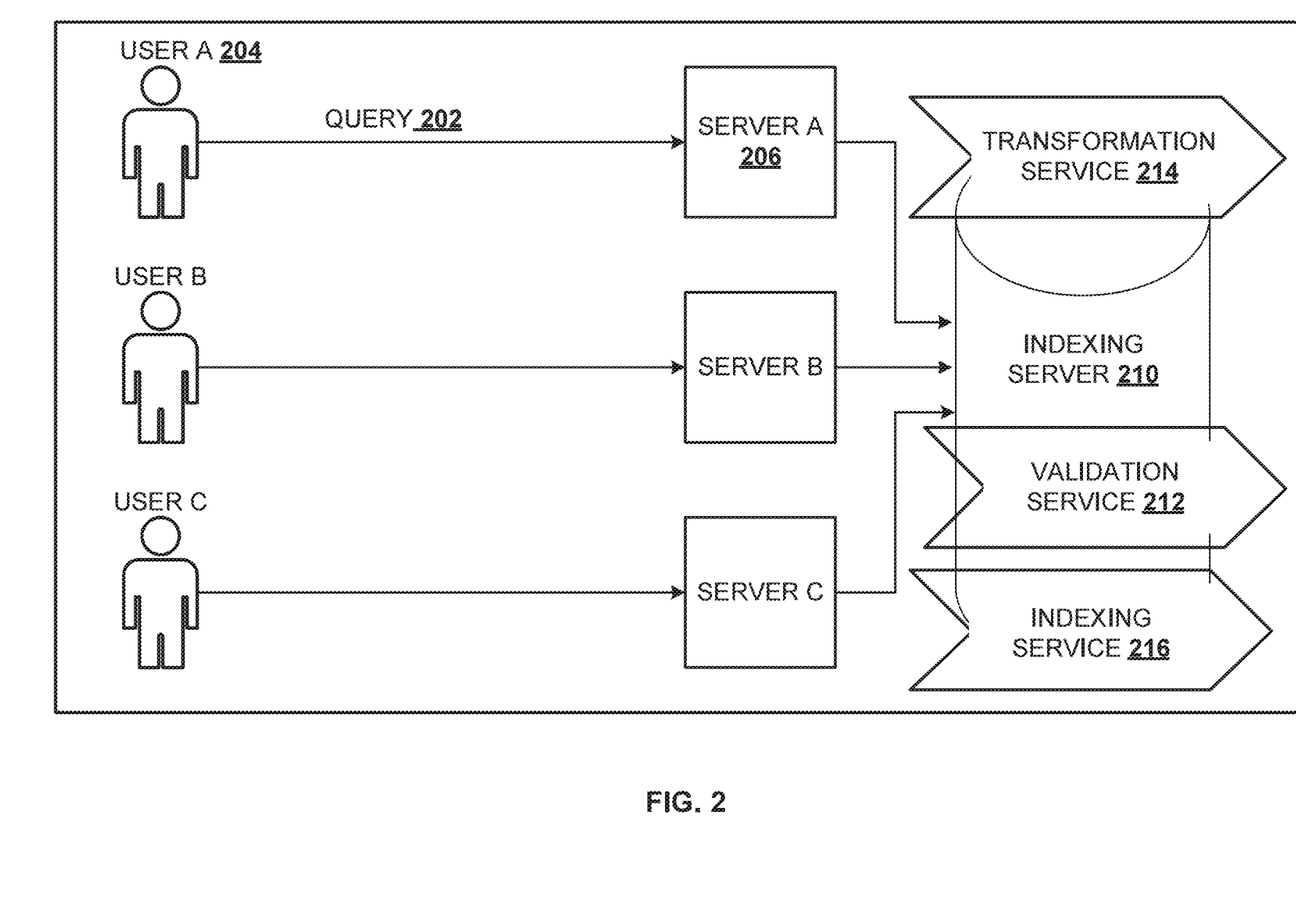
FIG. 2 is a block diagram illustrating an indexing server in a cluster server environment, according to one embodiment.

FIG. 2 is a block diagram illustrating indexing server in a cluster server environment, according to one embodiment. Query 202 may be received from 'user A' 204 to access 'document A' (not shown), and the query 202 is received at 'server A' 206. The 'server A' 206 routes the query 202 to indexing server 210. The indexing server 210 includes various services such as validation service 212, transformation service 214 and indexing service 216. Each of these services includes a logic or an algorithm to index the 'document A'. The individual document is associated with a document identifier such as CUID (collision resistant unique identifier). The CUID of 'document A' is 'AS1oZEJAynpNjZIaZK2rc7g'. The individual dataset is associated with a data source type e.g. excel, CSV, etc., and the dataset originator/path e.g. C:\abc\document A.xlsx, where the dataset is located. The document may include data from one or more datasets, for example, 'document A' includes dataset 'DS1' of type excel with path C:\abc\doc1.xlsx, and dataset 'DS2' of type CSV with path C:\abc\doc3.csv. For example, the 'document A' is at a first level and includes the dataset 'DS1' at a second level, and the dataset 'DS1' includes data at a third level. An inherent hierarchical relationship is established between the 'document A' at the first level, the dataset 'DS1' at the second level, and the data at the third level. A datasetId may be generated for the dataset 'DS1' based on the data source type and the dataset path. The datasetId is a hash value generated based on the data source type and the dataset path using any of the hash algorithms. For the dataset 'DS1' a hash value 'hash A', and for the dataset 'DS2' a hash value 'hash B' is computed.

When the query 202 routed from 'server A' 206 is received at the indexing server 210, the validation service 212 validates if the 'document A' was previously indexed. Even if the 'document A' is newly created, the validation service 212 checks if the CUID of the 'document A' is present in the indexing server 210 or a file system associated with the indexing server. 210 If the CUID of the 'document A' is present in the indexing server 210 or matches an entry in the indexing server 210, a check on the time stamp of the 'document A' is performed. If the last modified date of the 'document A' and the timestamp available at the indexing server 210 matches, then it is inferred that the 'document A' was previously indexed, and the previously indexed information is reused. Here, the previously indexed 'document A' corresponding to the first level of information is identified by the validation service. The previously indexed 'document A' includes indexed dataset 'DS1' and corresponding data.

In case the CUID of the 'document A' is not available in the indexing server 210, then a transformation service determines whether the 'hash A' of the dataset 'DS1' and/or the 'hash B' of the dataset 'DS2' is available in the indexing server repository. Upon determining that 'hash A' is available in the indexing server repository, a metadata associated with the 'DS1' is compared with the metadata previously stored in the indexing server. Upon determining that the metadata associated with the 'DS1' is similar or a subset of the metadata previously stored in the indexing server, the previously indexed 'DS1' is reused from the indexing server. Here, the previously indexed 'DS1' corresponding to the second level of information is identified by the transformation service. Similarly, the transformation service determines whether the 'hash B' of the dataset 'DS2' is available in the indexing server repository. Upon determining that the 'hash B' is not available in the indexing server repository, an indexing service is invoked.

The indexing service or indexing job may be performed using two types of threads such as a metadata indexing thread and a list of value indexing thread. The metadata indexing thread is used to index the metadata associated with the dataset. For example, the metadata such as city, state, country, etc., of the dataset 'DS2' are indexed using the metadata indexing thread. The list of value indexing thread is used to index the values corresponding to the metadata in the dataset 'DS2'. For example, the list of values such as 'Bangalore', 'Karnataka', 'India', etc., are indexed using the list of value (LOV) indexing thread. A single document may include data from more than one dataset. A user while accessing a specific dataset in the document may switch to a different dataset within the dataset, or switch to a different document. When the user switches to the different dataset or to the different document, the current indexing is paused, and when the user returns to the previous dataset, the paused indexing process is resumed. By pausing the current indexing, performance of the query processing is improved. The performance of query processing at par or better in the indexing server in comparison to processing the query with no indexing. The indexing service performs various functionalities such as validating if indexing should be done, determining if metadata indexing is to be performed or the list of value indexing is to be performed, determine if the indexing is to be paused or resumed, etc. In a similar manner requests from 'user B' and 'user C' are processed by 'server B' and 'server C' respectively as explained above with respect to the 'server A'. These services such as the validation service 212, the transformation service 214 and the indexing service 216 execute as background jobs or tasks.

Figure 3:
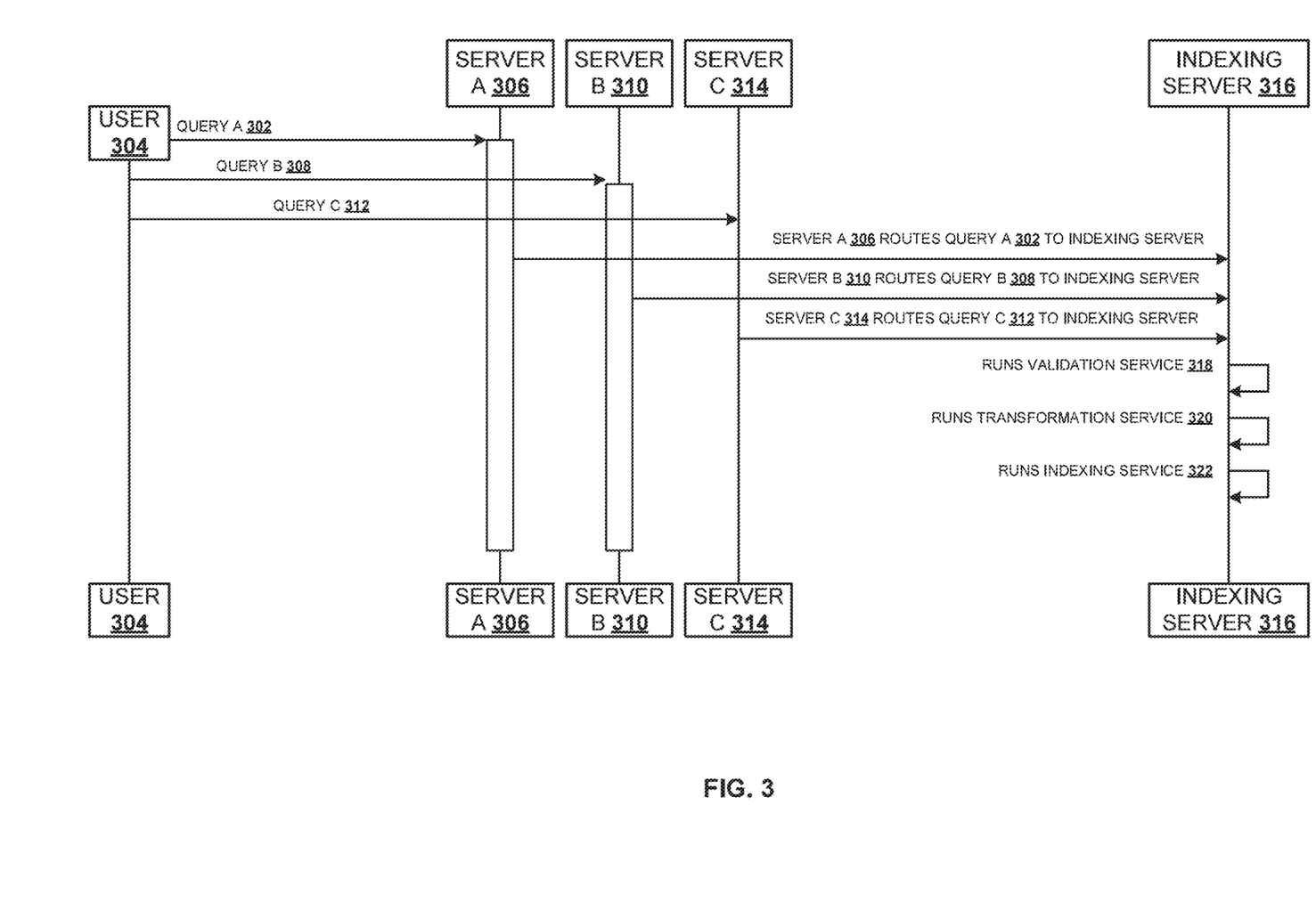
FIG. 3 is a sequence diagram illustrating an optimized indexing in natural language processing, according to one embodiment.

FIG. 3 is a sequence diagram illustrating optimized indexing in natural language processing, according to one embodiment. 'Query A' 302 is received from user 304 at 'server A' 306, 'query B' 308 is received from the user 304 at 'server B' 310 and 'query C' 312 is received from the user 304 at 'server C' 314. The 'server A' 306 routes the 'query A' 302 to 'indexing server' 316, the 'server B' 310 routes the 'query B' 308 to the 'indexing server' 316, and the 'server C' 314 routes the 'query C' 312 to the 'indexing server' 316. For the individual queries, validation service 318, transformation service 320 and indexing service 322 are executed at the indexing server 316. The services or the combination of services may be executed for the specific query as appropriate. The processing at the indexing server 316 for various queries may be executed in the order received or in any order that may be deemed appropriate. When a query is received from the user 304, the query is directed to the server that is capable of handling and servicing the query. In a scenario of cluster server, when a request or query is received from the user 304, the query is directed to a server from among the cluster server that is most appropriate or available to service the query. The queries from the various servers are routed to the indexing server 316. For the received queries, various services such as the validation service 318, the transformation service 320 and the indexing service 322 are executed at the indexing server 316 to determine the response corresponding to the query.

Figure 4:
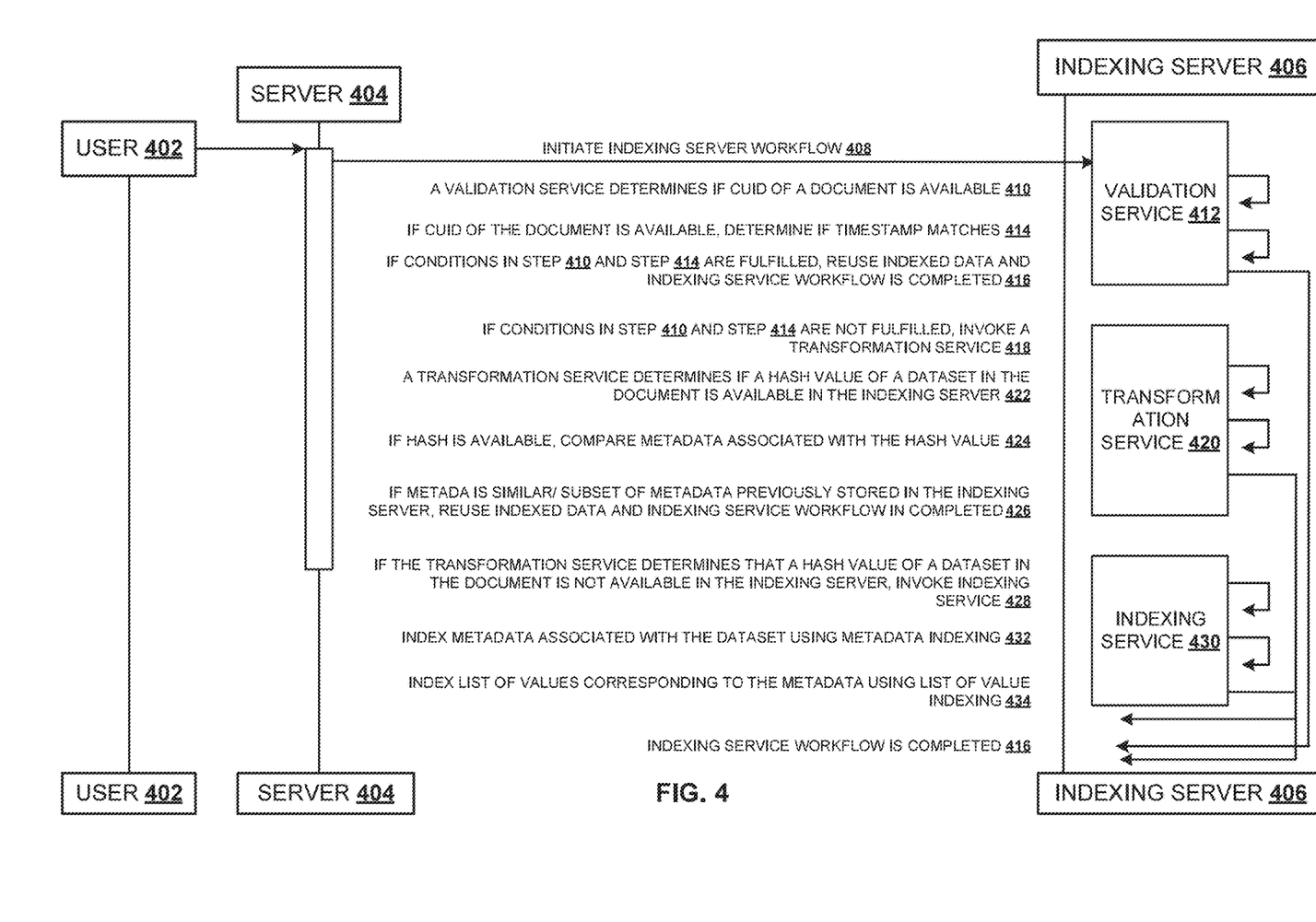
FIG. 4 is a sequence diagram illustrating an exemplary use case for optimized indexing in natural language processing, according to one embodiment.

FIG. 4 is a sequence diagram illustrating an exemplary use case for optimized indexing in natural language processing, according to one embodiment. The user 402 may access or open an existing document e.g. 'document X', in a data analytics application by providing a natural language input. The document may include data from various datasets such as 'DSX'. The individual dataset may be associated with a data source e.g. excel, and the dataset originator/path e.g. D:\abc\document X.xlsx, where the dataset is located. The individual document is associated with a document identifier such as CUID. For the dataset 'DSX' a hash value 'hash X' is computed. The natural language input is transformed into a query by the functions in the data analytics application. The query is received from the user 402 at server 404, and the server 404 routes the query to indexing server 406. At 408, the indexing server workflow is initiated at the indexing server 406. At 410, validation service 412 determines whether the CUID of the 'document X' being accessed is present/available in the indexing server 406. Upon determining that the CUID of 'document X' is available at the indexing server 406, at 414, it is determined whether the last modified timestamp of the 'document X' matches a timestamp of the previously indexed 'document X' available at the indexing server 406. If the last modified timestamp of the 'document X' and the timestamp available at the indexing server 406 matches, then it is inferred that the 'document X' was previously indexed, and the previously indexed information is reused. Here, the previously indexed 'document X' corresponding to the first level of information is determined by the validation service. Reusing the indexed information results in performance improvement since repeated or unnecessary re-indexing is avoided and the performance of query processing is improved. Upon determining that the conditions in the step 410 and step 414 are fulfilled, at 416, the previously indexed document is returned to the server 404 and the indexing service workflow is completed 416.

Upon determining that the conditions in the step 410 and step 414 are not fulfilled, at 418, transformation service 420 is invoked. In case the CUID of the 'document X' is not available in the indexing server 406, at 422, the transformation service 420 determines whether 'hash X' of dataset 'DSX' is available in the indexing server 406. Upon determining that 'hash X' is available at the indexing server 406, at 424, metadata associated with the 'DSX' is compared with the metadata previously stored at the indexing server 406. Upon determining that the metadata associated with the 'DSX' is similar or a subset of the metadata previously stored at the indexing server 406, at 426, the previously indexed 'DSX' is reused from the indexing server 406. Here, the previously indexed 'DSX' corresponding to the second level of information is identified by the transformation service. Similarly, the transformation service determines whether the 'hash X' of dataset 'DSX' is available in the indexing server 406. At 428, upon determining that 'hash X' is not available in the indexing server 406, indexing service 430 is invoked. At 432, the metadata indexing thread is used to index the metadata associated with the dataset 'DSX'. At 434, the list of value indexing thread is used to index the values corresponding to the metadata in the dataset 'DSX'. Once the metadata indexing and the list of value indexing is performed, the indexing service workflow is completed 416. The services such as the validation service 412, the transformation service 420 and the indexing service 430 are invoked based on the extent to which indexing is required. For example, if the validation service 412 is successful, then the transformation service 420 and the indexing service 430 is not invoked. This way the indexing is optimized since specific indexing service is invoked on a need basis and they by improving the performance of processing the query in the indexing server 406.

Figure 5:
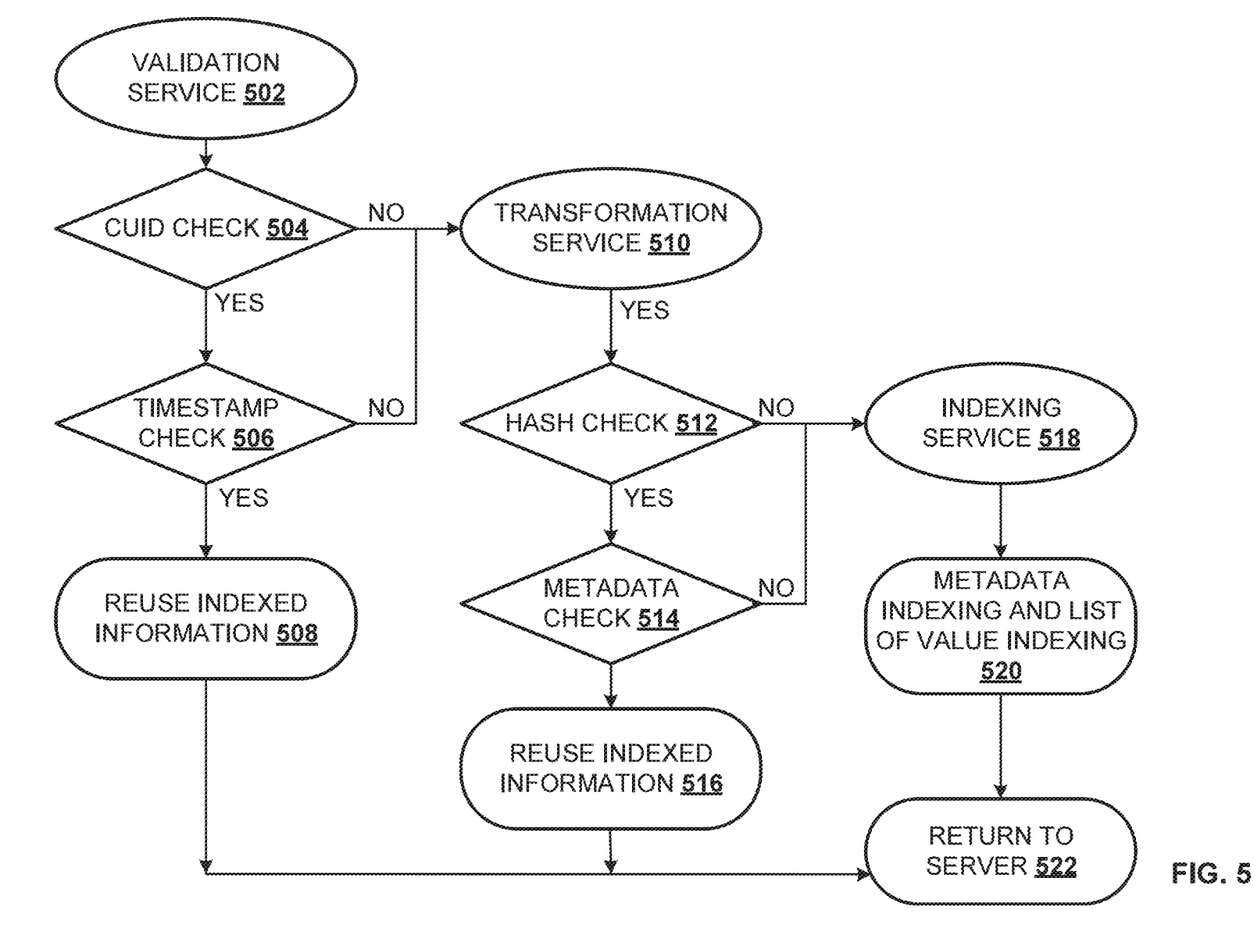
FIG. 5 is a flow diagram illustrating services performed in an indexing server, according to one embodiment.

FIG. 5 is a flow diagram illustrating services performed in an indexing server, according to one embodiment. When a request is received from a user at a server, the server routes the request to an indexing server. Indexing server workflow is initiated at the indexing server, and in the indexing server workflow, validation service 502 is initiated. At 504, the validation service 502 determines whether a CUID of a document is present/available in the indexing server or a file system associated with the indexing server. Upon determining that the CUID of the document is available in the indexing server, at 506, a time-stamp of the document is checked. If the last modified timestamp of the document and the timestamp of the document available at the indexing server matches, it is inferred that the document was previously indexed. The previously indexed document is reused 508 and the validation service is inferred to be successfully executed. The previously indexed 'document A' corresponding to the first level of information is identified by the validation service. Upon determining that the CUID of the document is not available in the indexing server, at 510, a transformation service at the indexing server is invoked. At 512, the transformation service determines whether 'hash' of a dataset is available in the indexing server. Upon determining that the 'hash' is available in the indexing server repository, at 514, metadata associated with the dataset is compared with the metadata previously stored at the indexing server. Upon determining that the metadata associated with the dataset is similar or a subset of the metadata previously stored at the indexing server, at 516, the previously indexed dataset is reused from the indexing server. The transformation service is inferred to be successfully executed. Here, the previously indexed dataset corresponding to the second level of information is identified by the transformation service. If it is determined that the dataset is not available, at 518, an indexing service at the indexing server is invoked. At 520, the indexing service or indexing job may be performed using two types of threads such as a metadata indexing thread and a list of value indexing thread. The metadata indexing thread is used to index the metadata associated with the dataset. For example, the metadata such as city, state, country, etc., of the dataset are indexed using the metadata indexing thread. The list of value indexing thread is used to index the values corresponding to the metadata in the dataset. For example, the list of values such as 'Buffalo', 'New York', 'United States', etc., are indexed using the list of value (LOV) indexing thread. At 522, the execution of request received from the user is complete, and the result of execution is returned to the server. In step 508 and 516, the indexed information is reused and returned as result, whereas, in the indexing service scenario, the information in the document is indexed and response returned to the server.

Figure 6:
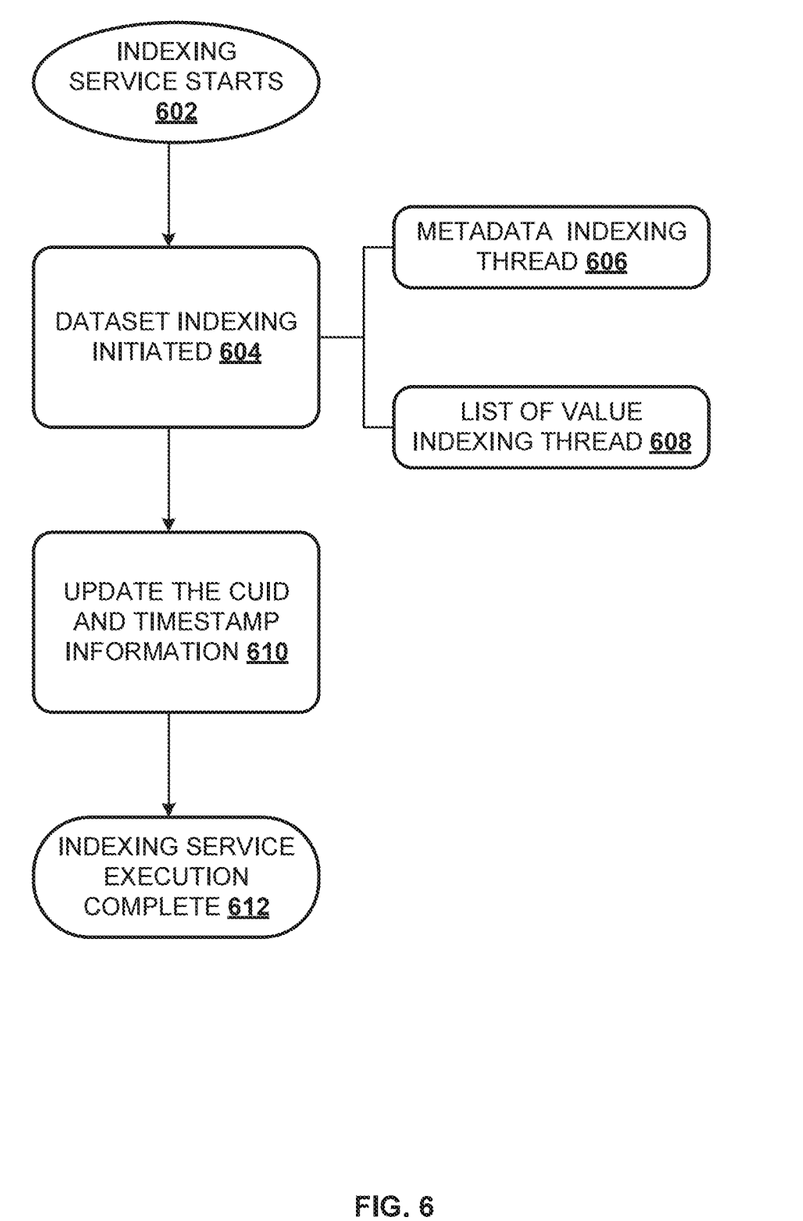
FIG. 6 is a flow diagram illustrating an indexing thread performed in an indexing server, according to one embodiment.

FIG. 6 is a flow diagram illustrating indexing service performed in an indexing server, according to one embodiment. When the indexing service starts 602, indexing a dataset is initiated 604. The indexing service or indexing job may be performed using two types of threads such as metadata indexing thread 606 and list of value indexing thread 608. In the metadata indexing thread 606 referred to as a first thread is used to index the metadata associated with the dataset. For example, the metadata such as columns city, state, country, etc., of the dataset are indexed using the metadata indexing thread. The list of value indexing thread 608 referred to as second thread is used to index the values corresponding to the metadata in the dataset. For example, the list of values such as 'Bangalore', 'Karnataka', 'India', etc., are indexed using the list of value (LOV) indexing thread for second thread. Once the indexing is completed, CUID of the dataset and the timestamp information is updated and stored 610 at the indexing server. This infers that the indexing service execution is complete 612.

Figure 7:
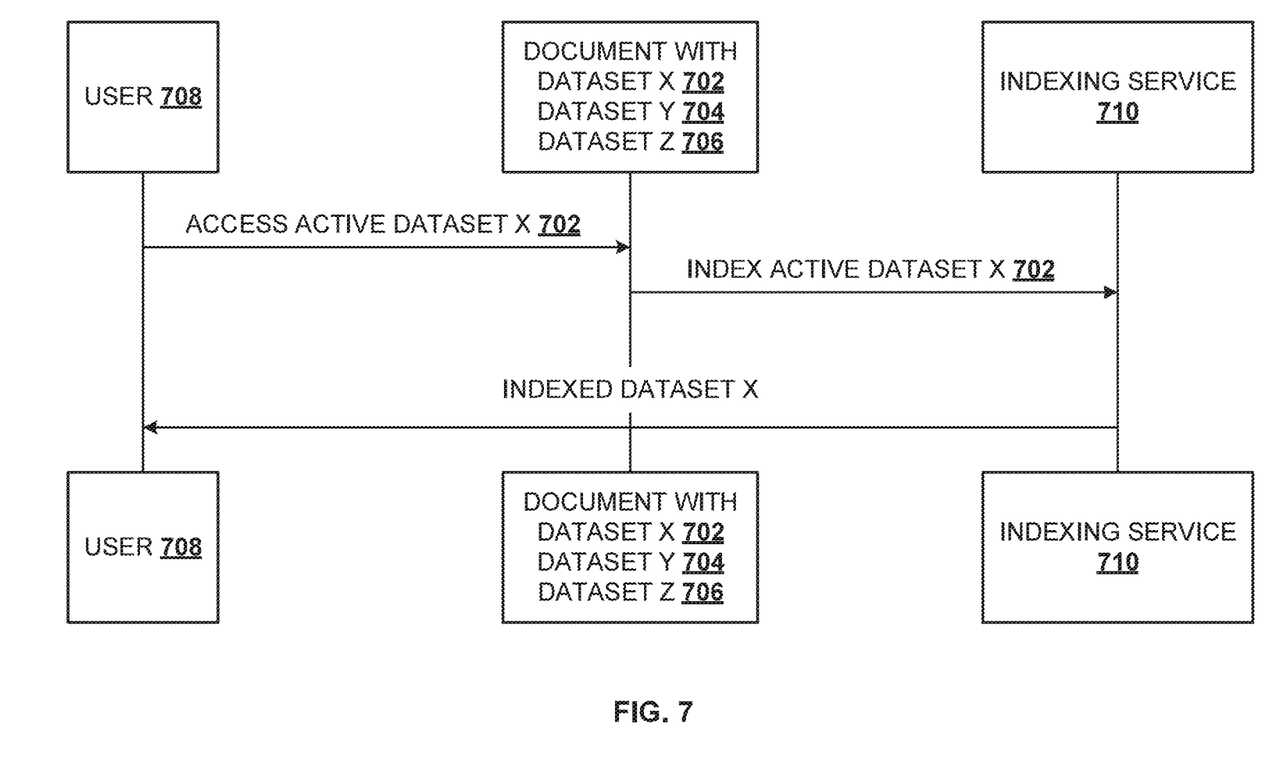
FIG. 7 is a block diagram illustrating an indexing active dataset, according to one embodiment.

FIG. 7 is a block diagram illustrating indexing active dataset, according to one embodiment. A document may have three datasets such as dataset X 702, dataset Y 704 and dataset Z 706. When user 708 accesses the dataset X 702 in the document, the dataset X 702 is referred to as the active dataset and a first dataset. The dataset Y 704 and the dataset Z 706 are referred to as inactive datasets and a second and third dataset respectively. If the document has more than one dataset, the dataset that is not active is not indexed. Indexing only the active dataset X i.e. the first dataset, helps in saving of processing power and lowering memory consumption. Accordingly, the active dataset X 702, i.e. the first dataset is indexed by the indexing service 710, whereas, the inactive dataset Y 704 i.e. the second dataset and dataset Z 706 i.e. the third dataset in the document are not indexed. The indexed dataset X 702 is returned to the user 708. In one embodiment, when the user selects dataset Y 704 to search and query, the dataset Y 704 is inferred as an active dataset. The active dataset Y 704 is indexed by the indexing service 710 provided that the dataset Y 704 was not previously indexed by the indexing service.

Figure 8:
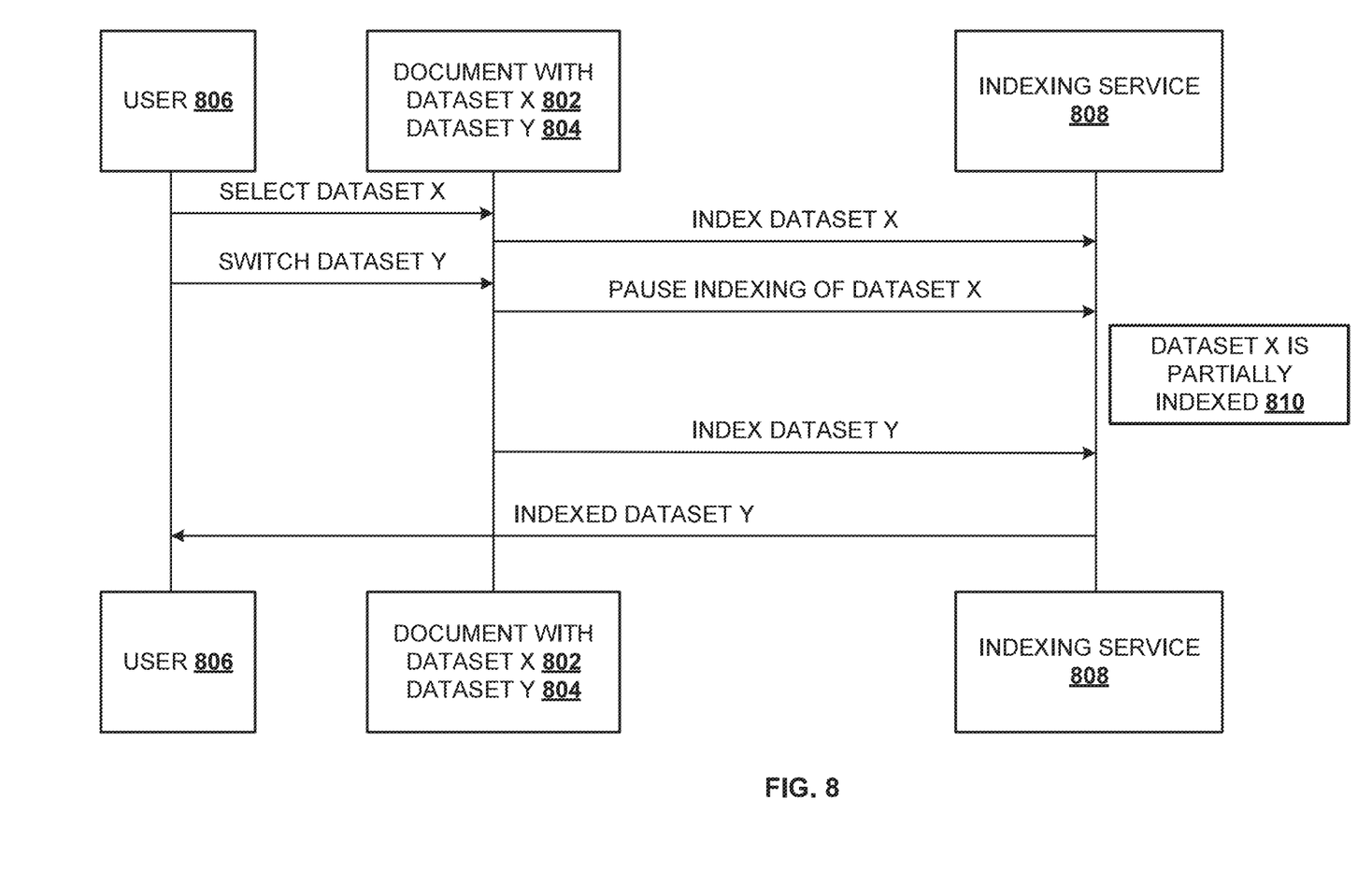
FIG. 8 is a block diagram illustrating switching between datasets, according to one embodiment.

FIG. 8 is a block diagram illustrating switching between datasets during indexing, according to one embodiment. A document may have two datasets such as dataset X 802 and dataset Y 804. If user 806 selects dataset X 802, the dataset X 802 is referred to as the active dataset. If the active dataset X 802 was not previously indexed, then the dataset X 802 is indexed by the indexing service 808. However, when the user 806 switches from the dataset X 802 to dataset Y 804, the process of indexing dataset X 802 is paused, and indexing of the dataset Y 804 is initiated. The dataset X is partially indexed 810 before pausing the indexing service. The indexing service is optimized in this approach, where the dataset X 802 that is not used is not indexed any further. Once indexing the dataset X 802 is paused, a new thread is spawned in a separate thread-pool to index the current dataset for example dataset Y 804. If the dataset Y 804 is not previously indexed, the dataset Y 804 is indexed by the indexing service 808.

Figure 9:
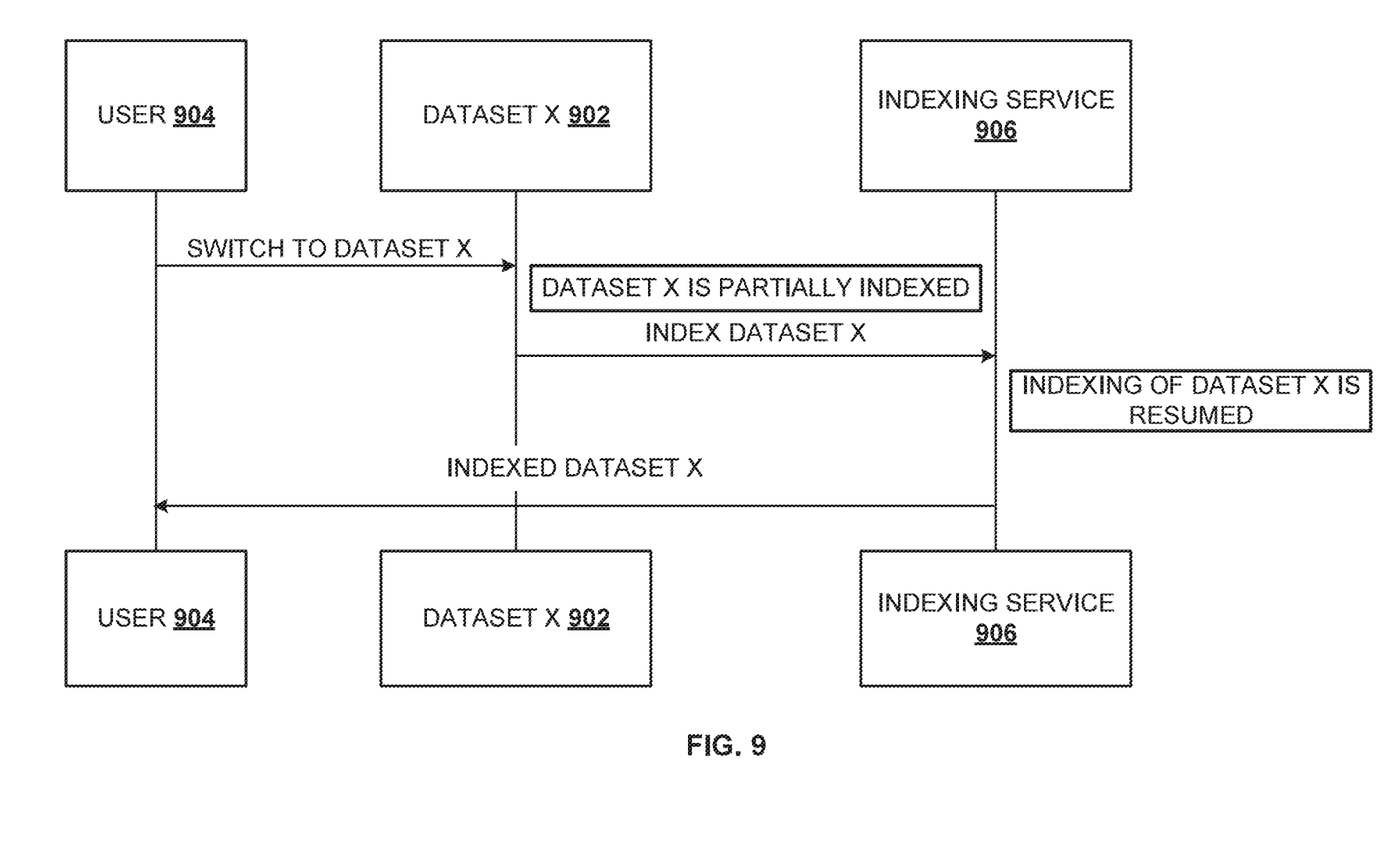
FIG. 9 is a block diagram illustrating switching between datasets, according to one embodiment.

FIG. 9 is a block diagram illustrating switching between datasets during indexing, according to one embodiment. A document may have a dataset such as dataset X 902. When the user 904 selects dataset X 902, the dataset X 902 referred to as the active dataset, is indexed by the indexing service 906. However, when the user 904 switches from the dataset X 902 to a different dataset, the process of indexing dataset X 902 is paused. The dataset X 902 is partially indexed before pausing. At a later point of time, the user 904 chooses to switch back to the dataset X 902 that was partially indexed earlier. When the user 904 switches to accessing the dataset X 902 that was partially indexed earlier, the previously paused indexing service on the dataset X 902 is resumed. Indexing of the dataset X 902 follows the threads of execution as explained above with reference to FIG. 2. Indexing of the dataset X 902 is resumed and completed if the user continues to work with dataset X 902 without interruption. If the dataset X 902 was previously indexed completely and if there was no change in the dataset X 902, previously indexed dataset X 902 is reused.

Figure 10:
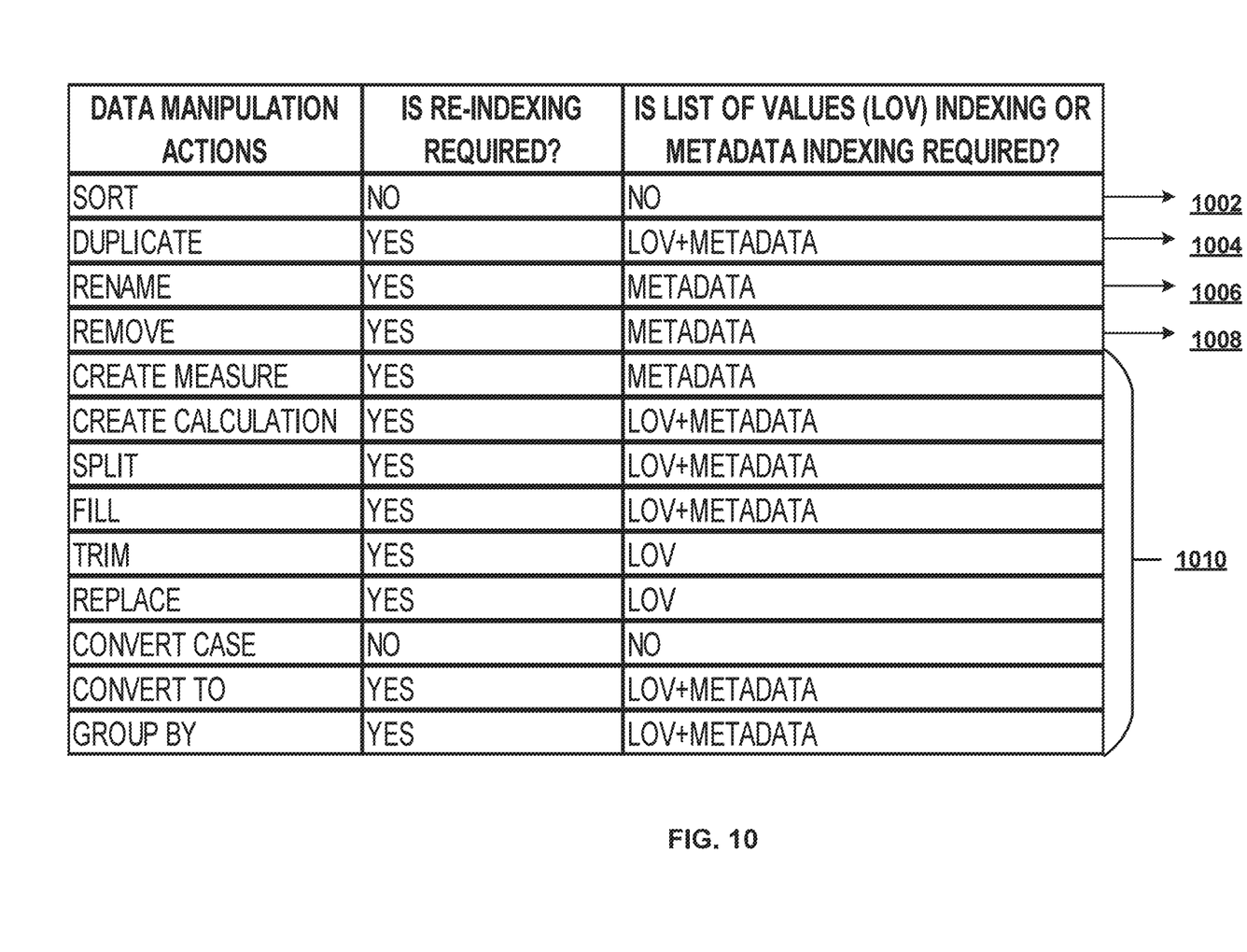
FIG. 10 is a table illustrating data manipulation actions, according to one embodiment.

FIG. 10 is a table illustrating data manipulation actions, according to one embodiment. Various data manipulation actions/workflows may be performed on a dataset in a document as shown in FIG. 3. For example, when a user accesses the document to perform sort action on the data in the dataset, the previously indexed information of the document is not affected and may be reused as shown in 1002. Since re-indexing is not required for the sort operation, list of value (LOV) indexing or metadata indexing is not required to be performed as shown in 1002. When the data manipulation action such as removing a duplicate column along with values is performed in the dataset, the data in the dataset is changed and this requires the dataset to be indexed again as shown in 1004. Further, the re-indexing includes metadata indexing that is performed on the metadata with the column name and LOV indexing performed on the list of values in the columns as shown in 1004. When the data manipulation action such as renaming a column is performed in the dataset, the data in the dataset is changed and this requires the dataset to be indexed again as shown in 1006. Re-indexing the dataset includes metadata indexing that is performed on the metadata with the column name as shown in 1006. When the data manipulation action such as removing, a column is performed in the dataset, the data in the dataset is changed and this requires the dataset to be indexed again as shown in 1008. Re-indexing the dataset includes metadata indexing that is performed on the metadata with the column names as shown in 1008. Similarly, for the various data manipulation operations such as create measure, create calculation, split, fill, trim, replace, convert case, convert to and group by indexing/re-indexing is performed as shown in list 1010.

Figure 11:
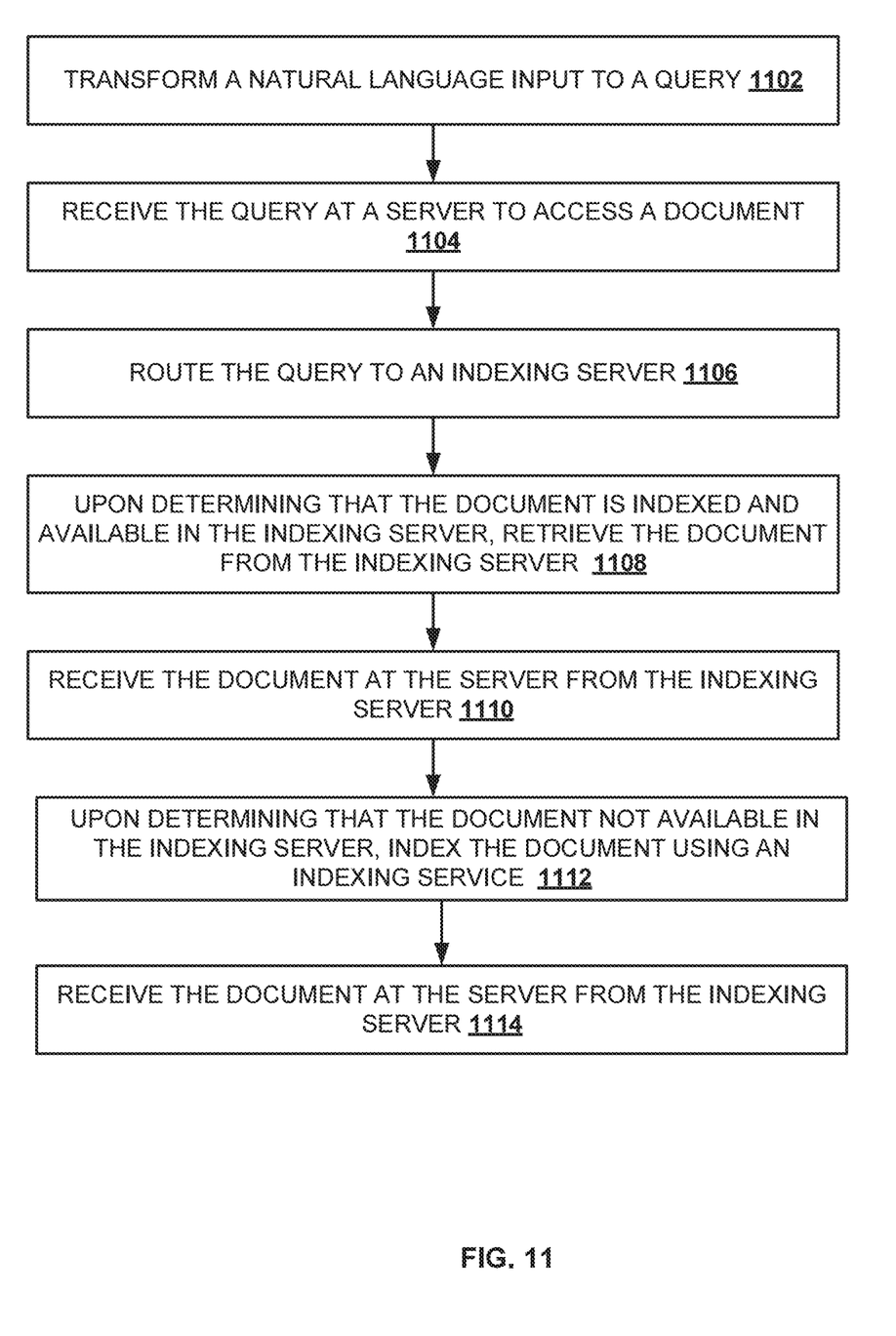
FIG. 11 is a flow diagram illustrating optimized indexing in natural language processing, according to one embodiment.

FIG. 11 is a flow diagram illustrating optimized indexing in natural language processing, according to one embodiment. At 1102, a natural language input is transformed to a query. The transformation of the natural language input to the query is performed by functions in a data analytics application. At 1104, the query is received at a server to access a document. At 1106, the query is routed to an indexing server from the server. Upon determining that the document is indexed and available in the indexing server, at 1108, the document is retrieved from the indexing server. At 1110, the document is received at the server from the indexing server. Upon determining that the document is not available in the indexing server, at 1112, the document is indexed using an indexing service. At 1114, the document is received at the server from the indexing server.

Since the algorithm aims to index or re-index a document or a dataset that is active, indexing is on-demand and dynamic. The indexing process takes place automatically in the background as a background job. The logic and algorithm of validation service, transformation service and indexing service enables tracking various conditions on when indexing is to be performed to ensure an up to date indexing is available. A document is indexed, and subsequently when a user starts typing a natural language input, the content from the indexed information is provided as auto prompt or auto complete information while the user starts typing the natural language input. Comparing a scenario where there is no indexing and a scenario of indexing using the indexing server, performance of the queries remains the same. This implies the fact that indexing using the services in the indexing server results in a performance that is at par with natural language processing without indexing.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 12:
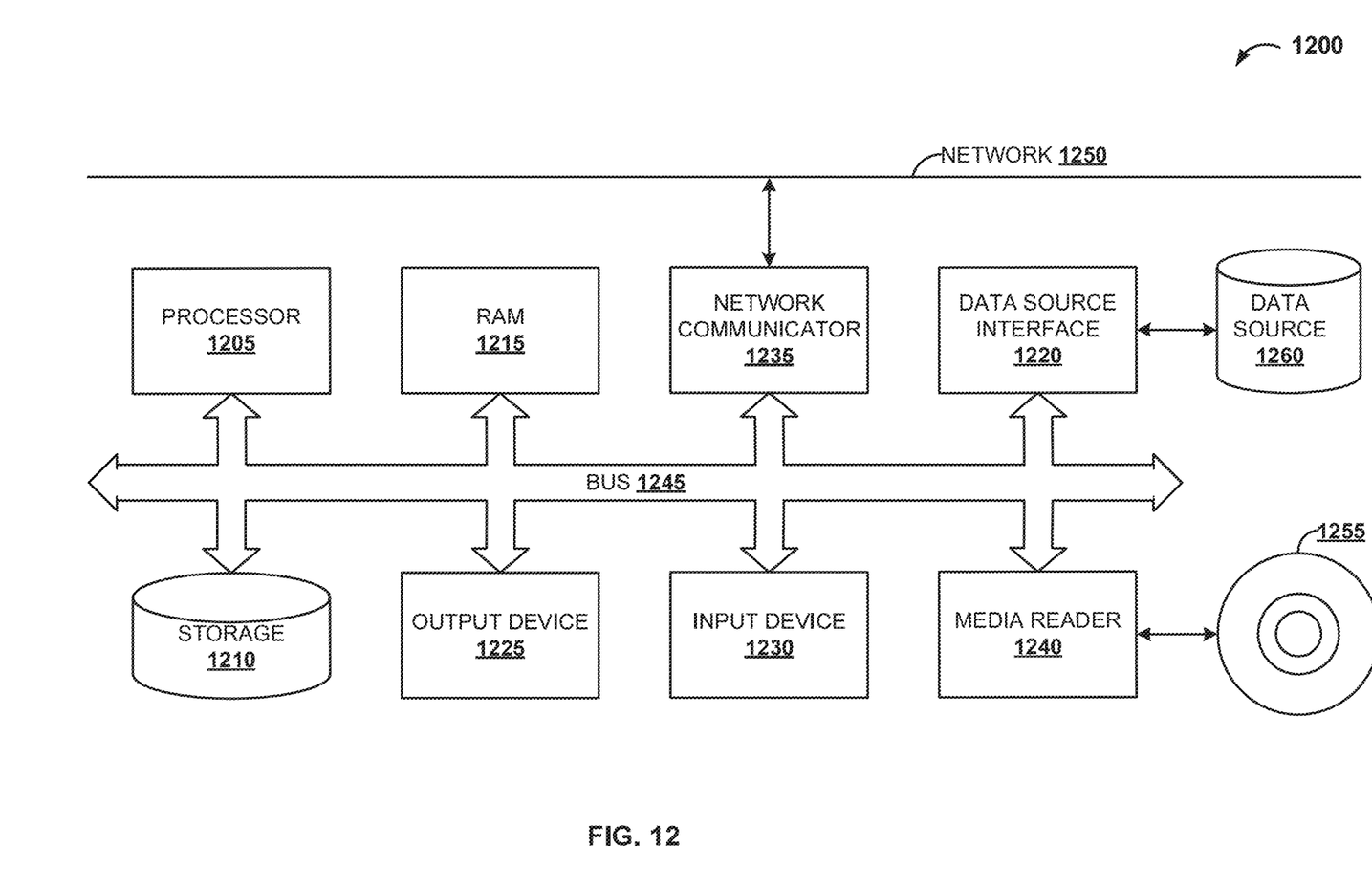
FIG. 12 is a block diagram of an exemplary computer system, according to one embodiment.

FIG. 12 is a block diagram of an exemplary computer system 1200. The computer system 1200 includes a processor 1205 that executes software instructions or code stored on a computer readable storage medium 1255 to perform the above-illustrated methods. The computer system 1200 includes a media reader 1240 to read the instructions from the computer readable storage medium 1255 and store the instructions in storage 1210 or in random access memory (RAM) 1215. The storage 1210 provides a large space for keeping static data where at least some instructions could be stored for later execution. The stored instructions may be further compiled to generate other representations of the instructions and dynamically stored in the RAM 1215. The processor 1205 reads instructions from the RAM 1215 and performs actions as instructed. According to one embodiment, the computer system 1200 further includes an output device 1225 (e.g., a display) to provide at least some of the results of the execution as output including, but not limited to, visual information to users and an input device 1230 to provide a user or another device with means for entering data and/or otherwise interact with the computer system 1200. Each of these output devices 1225 and input devices 1230 could be joined by one or more additional peripherals to further expand the capabilities of the computer system 1200. A network communicator 1235 may be provided to connect the computer system 1200 to a network 1250 and in turn to other devices connected to the network 1250 including other clients, servers, data stores, and interfaces, for instance. The modules of the computer system 1200 are interconnected via a bus 1245. Computer system 1200 includes a data source interface 1220 to access data source 1260. The data source 1260 can be accessed via one or more abstraction layers implemented in hardware or software. For example, the data source 1260 may be accessed by network 1250. In some embodiments the data source 1260 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object-oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   route a query received at a server to an indexing server, wherein the query is generated by transforming a natural language input, and wherein the query is for accessing a document;
   in response to determining that the document is indexed and available in the indexing server:
      retrieve the document from the indexing server, wherein the determination is performed by services that are executed at the indexing server as background tasks; and
      provide the document to the server from the indexing server for accessing the document from the server;
   in response to determining that the document is not available in the indexing server:
      using a transformation service to determine whether a hash of a dataset of the document is available in the indexing server;
      in response to determining that the hash of the dataset of the document is available in the indexing server, compare metadata associated with the dataset with metadata previously stored at the indexing server;
      in response to determining that the metadata associated with the dataset is a subset of the metadata previously stored at the indexing server, reuse a previously indexed dataset from the indexing server; and
      provide a document including the indexed dataset to the server for accessing.

2. The computer-readable medium of claim 1, further comprises instructions which when executed by the computer further cause the computer to:
   using a validation service, determine whether a collision resistant unique identifier (CUID) of the document is present in the indexing server;
   in response to determining that the CUID of the document is present in the indexing server, determine whether a last modified timestamp of the document matches a timestamp of the document available at the indexing server; and
   in response to determining that the last modified timestamp of the document matches the timestamp of the document available at the indexing server, reuse the document previously indexed and available at the indexing server.

3. The computer-readable medium of claim 1, further comprises instructions which when executed by the computer further cause the computer to:
   in response to determining that the hash of the dataset is not available in the indexing server:
      invoke an indexing service;
      index metadata associated with the dataset by a metadata indexing thread;
      index a list of values corresponding to the metadata in the dataset by a list of value indexing thread; and
      store a CUID of the document and a timestamp of the document on the indexing server.

4. The computer-readable medium of claim 3, wherein the hash of the dataset is based on a data source type and a dataset path.

5. The computer-readable medium of claim 4, further comprises instructions which when executed by the computer further cause the computer to:
   in response to determining that the dataset in the document is not accessed, pause indexing the dataset; and
   in response to determining that the dataset in the document is accessed, resume indexing the dataset.

6. The computer-readable medium of claim 5, further comprises instructions which when executed by the computer further cause the computer to:
   in response to determining that a first dataset in the document is accessed, identify the first dataset as an active dataset;
   in response to determining that a second dataset in the document is not accessed, identify the second dataset as an inactive dataset; and
   index the first dataset in the indexing server and not the second dataset.

7. A computer-implemented method of optimized indexing in natural language processing, the method comprising:
   routing a query received at a server to an indexing server, wherein the query is generated by transforming a natural language input, and wherein the query is for accessing a document;
   in response to determining that the document is indexed and available in the indexing server:
      retrieving the document from the indexing server, wherein the determination is performed by services that are executed at the indexing server as background tasks; and
      providing the document to the server from the indexing server for accessing the document from the server;
   in response to determining that the document is not available in the indexing server:
      using a transformation service to determine whether a hash of a dataset of the document is available in the indexing server;
      in response to determining that the hash of the dataset of the document is available in the indexing server, compare metadata associated with the dataset with metadata previously stored at the indexing server;
      in response to determining that the metadata associated with the dataset is a subset of the metadata previously stored at the indexing server, reuse a previously indexed dataset from the indexing server; and
      provide a document including the indexed dataset to the server for accessing.

8. The method of claim 7, further comprising:
   using a validation service, determine whether a collision resistant unique identifier (CUID) of the document is present in the indexing server;
   in response to determining that the CUID of the document is present in the indexing server, determine whether a last modified timestamp of the document matches a timestamp of the document available at the indexing server; and in response to determining that the last modified timestamp of the document matches the timestamp of the document available at the indexing server, reuse the document previously indexed and available at the indexing server.

9. The method of claim 7, further comprising:
in response to determining that the hash of the dataset is not available in the indexing server:
  invoking an indexing service;
  indexing metadata associated with the dataset by a metadata indexing thread;
  indexing a list of values corresponding to the metadata in the dataset by a list of value indexing thread; and
  storing a CUID of the document and a timestamp of the document on the indexing server.

10. The method of claim 9, wherein the hash of the dataset is based on a data source type and a dataset path.

11. The method of claim 10, further comprising:
in response to determining that the dataset in the document is not accessed, pausing indexing the dataset; and
in response to determining that the dataset in the document is accessed, resuming indexing the dataset.

12. The method of claim 11, further comprising:
in response to determining that a first dataset in the document is accessed, identifying the first dataset as an active dataset;
in response to determining that a second dataset in the document is not accessed, identifying the second dataset as an inactive dataset; and
indexing the first dataset in the indexing server and not the second dataset.

13. A computer system for optimized indexing in natural language processing, comprising:
a computer memory to store program code; and
a processor to execute the program code to:
  route a query received at a server to an indexing server, wherein the query is generated by transforming a natural language input, and wherein the query is for accessing a document;
  in response to determining that the document is indexed and available in the indexing server:
    retrieve the document from the indexing server, wherein the determination is performed by services that are executed at the indexing server as background tasks; and
    provide the document to the server from the indexing server for accessing the document from the server;
  in response to determining that the document is not available in the indexing server:
    using a transformation service to determine whether a hash of a dataset of the document is available in the indexing server;
    in response to determining that the hash of the dataset of the document is available in the indexing server, compare metadata associated with the dataset with metadata previously stored at the indexing server;
    in response to determining that the metadata associated with the dataset is a subset of the metadata previously stored at the indexing server, reuse a previously indexed dataset from the indexing server; and
    provide a document including the indexed dataset to the server for accessing.

14. The system of claim 13, wherein the processor further executes the program code to:
using a validation service, determine whether a collision resistant unique identifier (CUID) of the document is present in the indexing server;
in response to determining that the CUID of the document is present in the indexing server, determine whether a last modified timestamp of the document matches a timestamp of the document available at the indexing server; and
in response to determining that the last modified timestamp of the document matches the timestamp of the document available at the indexing server, reuse the document previously indexed and available at the indexing server.

15. The system of claim 13, wherein the processor further executes the program code to:
in response to determining that the hash of the dataset is not available in the indexing server, invoke an indexing service;
index metadata associated with the dataset by a metadata indexing thread;
index a list of values corresponding to the metadata in the dataset by a list of value indexing thread; and
store a CUID of the document and the timestamp of a document at the indexing server.

16. The system of claim 15, wherein the hash of the dataset is based on a data source type and a dataset path.

17. The system of claim 16, wherein the processor further executes the program code to:
in response to determining that the dataset in the document is not accessed, pause indexing the dataset; and
in response to determining that the dataset in the document is accessed, resume indexing the dataset.

* * * * *